No. 674,205. Patented May 14, 1901.
J. W. GRONEWOLD.
REPLANTER ATTACHMENT FOR CULTIVATORS.
(Application filed Mar. 12, 1901.)
(No Model.) 2 Sheets—Sheet I.
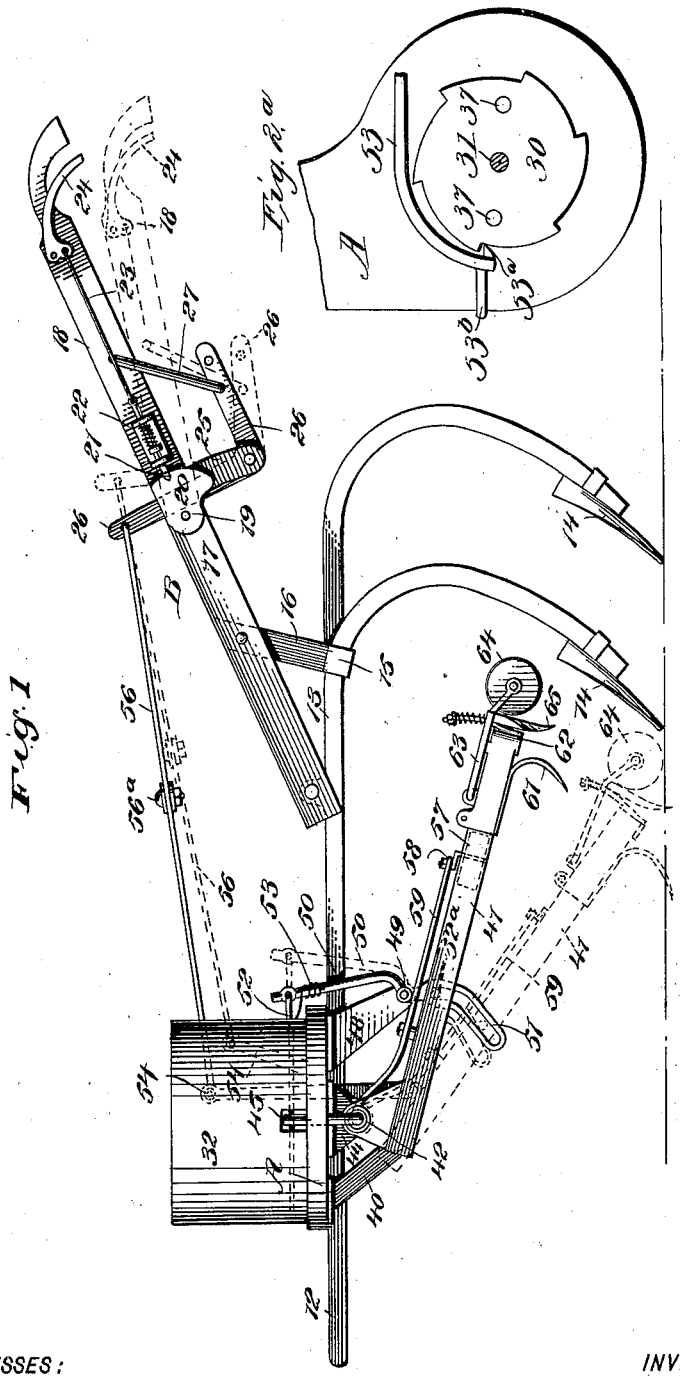
WITNESSES:
INVENTOR
Jurgen W. Gronewold
BY
ATTORNEYS No. 674,205. Patented May 14, 1901.
J. W. GRONEWOLD.
REPLANTER ATTACHMENT FOR CULTIVATORS.
(Application filed Mar. 12, 1901.)
(No Model.) 2 Sheets—Sheet 2.
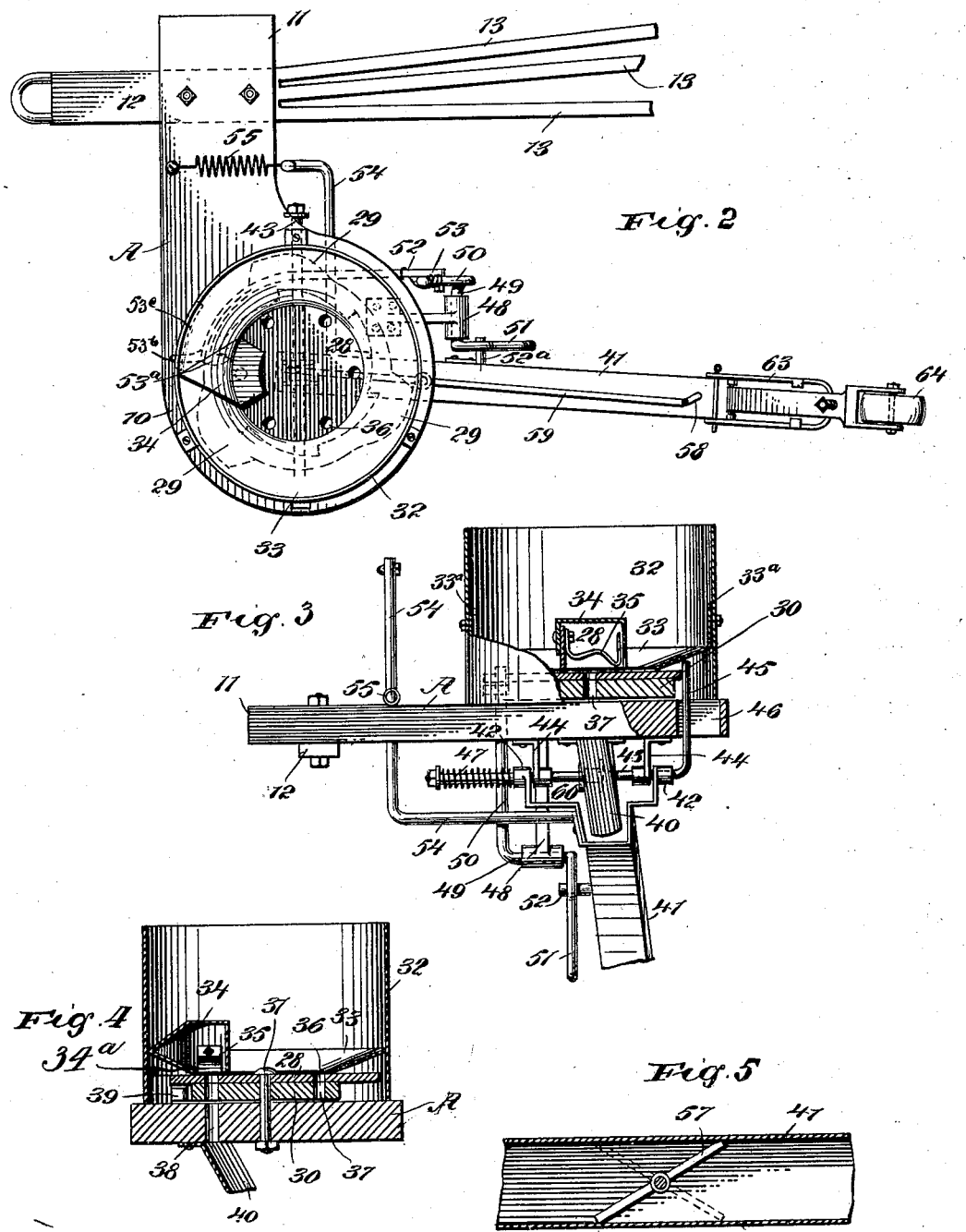

UNITED STATES PATENT OFFICE.

JURGEN W. GRONEWOLD, OF GOLDEN, ILLINOIS.

REPLANTER ATTACHMENT FOR CULTIVATORS.

SPECIFICATION forming part of Letters Patent No. 674,205, dated May 14, 1901.

Application filed March 12, 1901. Serial No. 50,830. (No model.)

*To all whom it may concern:*

Be it known that I, JURGEN W. GRONEWOLD, a citizen of the United States, and a resident of Golden, in the county of Adams and State of Illinois, have invented a new and Improved Replanter Attachment for Cultivators, of which the following is a full, clear, and exact description.

One object of my invention is to provide a simple replanting attachment readily applied to any cultivator and operated from the handle thereof and to so construct the device that a person operating the cultivator may at any time instantly and accurately drop a "set" of corn in a lost hill and add to one thinly planted while the field is being cultivated.

A further object of the invention is to so construct the attachment that at one movement of the operator's hand a few seeds or grains may be dropped on the ground, the furrow having been previously opened for said seed, and the dropped seed covered and rolled.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine, illustrating the seed-drop chute in upper and lower positions. Fig. 2$^a$ is a plan view of the operating devices for rotating the feed-disk. Fig. 2 is a plan view of the forward portion of the machine, the connection between the handle and seed-dropping mechanism being omitted. Fig. 3 is a front elevation of the machine, parts being broken away. Fig. 4 is a vertical section through the hopper and parts contained therein and a transverse section through the cross-head of the attachment, and Fig. 5 is a horizontal section through a portion of the seed-drop chute.

A represents a cross-head, one end, 11, of which is reduced in width and is substantially rectangular, while the other end, 10, is enlarged and circular. This cross-head A is secured in any approved manner to the beam 12 of the cultivator, which beam extends beyond the cross-head, as shown in Fig. 2, and the said beam is shown provided with three shanks 13, curved downward and forward at their rear ends, and at the rear portion of each of said shanks a suitable cultivator-blade 14 is attached. The shanks 13 of the beam 12 are connected near their curved portions by a cross-bar 15, and preferably a standard 16 is carried up from the left-hand end of this cross-bar or from the left-hand cultivator-shank, as shown in Fig. 1. This standard is attached to a handle B, the handle when attached to the standard being also attached to the cultivator-shank at a point in advance of the standard. The handle B is given an upward and rearward inclination and comprises a forward fixed section 17 and a rear section 18, which is pivotally attached to the fixed section by means of a pin 19 or its equivalent, and a rack 20 is secured to the fixed member or section of the handle B, the said rack being adapted to receive a spring-controlled bolt 21, held to slide in bearings 22, located on the pivoted section or member 18 of the handle. A link 23 is attached to the bolt 21 and to a finger-piece 24, pivoted on the pivoted section or member 18 of the handle, at the rear end portion thereof, as is also shown in Fig. 1. A bracket 25 is carried down from the fixed section 17 of the handle B, and on this bracket an angle-lever 26 is pivoted at the junction of its members. This angle-lever extends both above and below the handle, and when the bolt 21 is withdrawn from its keeper 20 and the pivoted section or member 18 of the handle B is carried downward, as shown in Fig. 1, the upper member of the elbow or angle lever 26 will be rocked rearward, as shown in dotted lines, and will bring into operation the seed-dropping mechanism, to be hereinafter described. When the bolt 21 is in locking engagement with the keeper 20, the seed-drop mechanism is inactive, and to this end the lower member of the lever 26 is connected with the pivotal section or member 18 of the handle B by a link 27, as is also shown in Fig. 1.

With reference to the seed-drop mechanism, a disk 28, provided with a ratchet-wheel 30, attached to or integral with its under face, is pivoted centrally by a suitable pin 31 on the circular section 10 of the cross-head A, as is shown in Fig. 4, and a hopper 32, which is secured to the cross-head, surrounds the said disk and ratchet-wheel. A suitable cover may be provided for the hopper 32. The disk 28 is provided with a series of circumferential cams 29, as is shown in dotted lines in Fig. 2, and these cams are adapted to actuate a gate in the seed-drop mechanism, as will be hereinafter set forth. A ring 33 is attached to the inner face of the hopper 32 above the disk 28, as shown in Figs. 2, 3, and 4, the attachment being made, as shown in Fig. 3, by lugs 33$^a$, which are bolted to the hopper. This ring is given an outward and upward inclination, as is shown in Figs. 3 and 4, and at one portion of the ring 33 a housing 34 is located, the bottom portion 35 of which is in the form of a spring. In the space surrounded by the ring 33 a series of circumferentially-arranged openings 36 is made in the disk, and corresponding openings 37 are produced in the ratchet-wheel 30. These openings constitute pockets and are adapted to receive seed, and as the disk and its ratchet-wheel are revolved the said registering openings one after the other are brought beneath the spring-bottom 35 of the housing 34 and the bottom tends to force the seed compactly into the apertures brought beneath it. A suitable brush 34$^a$ is also employed to prevent the surplus of seed from entering the housings 34, the said brush being located at the entrance end of the housing and may be of any known character. When the pockets 36 and 37 are beneath the housing, they will register with an opening 38 made in the cross-head A, as shown in Fig. 4, and the seed will fall down from the pocket into this opening 38 in the cross-head and into a short chute 40, attached to the cross-head just beneath the opening 38, which short chute is given a downward and rearward inclination and delivers the seed into a main drop-chute 41. This main drop-chute 41 is provided with bracket extensions at its upper end, and said bracket extensions terminate in sleeves 42, as shown in Fig. 3. A shaft 43 is loosely passed through these sleeves 42 and through bearings in brackets 44, attached to the bottom of the cross-head A, as shown in Fig. 3.

At one end of the shaft 43 a crank 45 is formed, and this crank extends through a suitable opening 46 up into the hopper below the ring 33, and the crank-arm 45 is held in engagement with the peripheral cams 29 of the seed-drop disk 28 by coiling a spring 47 around the shaft 43, said spring having bearing at one end against a suitable stop on the shaft, the opposite end of the spring being preferably made to engage with one of the eyes 42 at the upper portion of the main seed-drop chute 41. This shaft 43 is thus given a spasmodic end movement by reason of the crank-arm 45 being brought in engagement with the cam-surfaces 29 of the seed-dropping disk as the said disk is revolved, and a connection, to be hereinafter set forth, is made between this shaft and a gate 57, located in the main seed-drop chute 41.

A hanger 48 is downwardly and rearwardly projected from the bottom portion of the circular section 10 of the cross-head A. A shaft 49 is journaled in suitable bearings carried by the said hanger, and at the left-hand end of the shaft a downwardly-extending loop 51 is formed, while at the opposite end of the shaft a crank-arm 50 is located, which crank-arm is carried up at the rear of the circular section of the cross-head and is connected by a spring 53 with a dog 52. The forward end of this dog is curved to conform to the periphery of the ratchet-wheel 30, and the forward end of the dog is provided with a head 53$^a$, adapted to engage with the teeth of the ratchet-wheel 30, so that each time the crank-arm 50 is rocked in a forward direction the dog 52 will turn the ratchet-wheel 30 the distance of one tooth and will move the ratchet-wheel and attached disk 28 the distance of a space between opposing pockets. The ratchet-wheel is prevented from turning too rapidly or when not needed by engaging with its teeth a suitable spring-pawl 39, as illustrated in Fig. 4. The head 53$^a$ of the dog 52 is provided with an outwardly-extending horn 53$^b$, which has movement beneath a staple 53$^c$. (Shown in Fig. 2.) This guided horn prevents the dog 52 jumping out of place, and, further, the staple will stop the dog 52 at the exact place when the ratchet-wheel has been moved the distance of one tooth.

A pin 52$^a$ is secured to the right-hand side of the main seed-drop chute 41, and this pin enters the opening in the link member 51 of the shaft 49 and limits both the downward and the upward movement of the main seed-drop chute, as said chute is adapted to be moved to and from the ground. The seed-drop chute is normally held in the elevated position shown in positive lines in Fig. 2 by carrying an angle-arm 54 from the right-hand side of the forward portion of the main seed-drop chute and up at the rear of the cross-head A, where the members of said cross-head connect, and a spring 55, attached to the vertical section of the arm 54, tends to normally draw the said section forwardly, as is illustrated in Fig. 2.

A rod 56, preferably provided with a turnbuckle 56$^a$, is pivotally connected with the upper member of the elbow-lever 26, carried by the handle-lever B, and the upper end of the vertical member of the crank-arm 54, so that when the bolt 21 is disengaged from the keeper 20 on the handle and the pivotal handle-section 18 is carried down to the position shown in dotted lines the vertical member of the arm 54, attached to the main seed-drop chute, will be carried rearward, and the main seed-drop chute will be carried to the lower dotted position, also shown in Fig. 1.

Near the outlet end of the main seed-drop chute 41 a gate 57 is pivoted therein, as shown in Fig. 5, and the stem of this gate extends through the top of the seed-drop chute 41 and is provided at that point with a crank-arm 58, connected with one end of a lever 59, fulcrumed on the chute 41, and the other end of the lever is connected with the sliding shaft 43, the said lever being loosely mounted on said shaft between two collars 60. (See Fig. 3.) Thus as the shaft 43 is given end movement the gate 57 is alternately opened to the right and to the left, permitting the seed in the drop-chute 41 to pass the gate at the proper time.

The lower end of the main seed-drop chute 41 is closed, the outlet-opening of said chute being in the under face of the same, and just in front of this outlet-opening 62 of the seed-drop chute a furrow-opener 61 is attached to the under face of the chute. Upon the upper face of the chute 41, at its rear or delivery end, a spring-controlled yoke 63 is pivoted or hinged, and this yoke extends beyond the rear of the chute 41 and carries at its rear portion a roller 64. Blades 65 are likewise attached to the said yoke 63 between the rear end of the chute 41 and the roller 64. These blades 65 are given more or less of an inward inclination, and their purpose is to cover in the ground the seed escaping at the outlet 62, while the roller 64, immediately following, will press the soil on the seed.

When the seed-drop chute 41 is in its lower position and the furrow-opener and covering-blades are in the ground, the roller travels on the surface of the ground and is pressed upward against the tension of its controlling-spring, as shown best in Fig. 1. When the implement is used in connection with a riding-cultivator, any suitable form of handle or handles may be substituted for those shown, which are preferably used when attachment is made to a walking-cultivator.

Having thus described my invention, I claim as new and desire to secure by Letters Patent—

1. In a replanting attachment for cultivators, a cross head or bar adapted for attachment to the beam of the cultivator or the shanks for the cultivator-blades, a handle comprising a fixed and a pivoted section, a locking connection between the two sections, operated from the rear end of the handle, a lever pivoted on the fixed section of the handle, a connection between the said lever and pivoted section of the handle, a seed-drop mechanism carried by the cross head or bar, a pivoted seed-drop chute, and connections between the said handle-lever, the seed-drop mechanism and the seed-drop chute, whereby the said parts are controlled by the movement of the pivoted section of the handle, as described.

2. A seed-drop mechanism, a drop-chute pivotally connected with the said mechanism, the said chute being normally held in a raised position, a handle comprising a fixed and a pivoted section, and a connection between the pivoted section of the handle, the seed-drop mechanism and said chute, for the purpose set forth.

3. In a replanting attachment, a pivoted seed-drop chute, a tension device normally holding the chute in an elevated position, a handle provided with a fixed and a pivoted section, a locking device for the sections, operated from the rear end of the handle, and a connection between the pivoted section of the handle and the seed-drop chute, whereby when the pivoted section of the handle is pressed downward the seed-drop chute is carried in the same direction, as described.

4. In a replanting attachment, a pivoted seed-drop chute provided with a gate, a spring-controlled shaft capable of end movement, which shaft has a lever connection with said gate, a seed-drop mechanism, a handle, devices for imparting rotary movement to the seed-drop mechanism operated from the handle, and means, substantially as described, for imparting end movement to the said sliding shaft through the rotary movement of the said drop mechanism, as described.

5. In a replanting attachment, a pivoted seed-drop chute provided with a gate, a spring-controlled shaft capable of end movement, which shaft has a lever connection with said gate, a seed-drop mechanism, a handle, devices for imparting rotary movement to the seed-drop mechanism, operated from the handle, means, substantially as described, for imparting end movement to the said sliding shaft through the rotary movement of the seed-drop mechanism, a furrow-opener located at the outlet end of the seed-drop chute, a spring-controlled support attached to the seed-drop chute, extending beyond its rear end, a roller carried by the said support, and covering devices likewise carried by the said support and located between the roller and the rear end of the seed-drop chute.

6. In replanting attachments, the combination, with a support having a seed-outlet therein, a hopper located on the said support, a disk and attached ratchet-wheel mounted to turn in the said hopper, both the disk and attached ratchet-wheel being provided with corresponding openings forming seed-pockets, all of which pockets are capable of registering with the seed-outlet in the support, of a handle having a fixed and a movable section, a locking device for the handle, operated from its rear end, a lever mounted on the fixed section of the handle, a link connection between the pivoted section of the handle and the said lever, a chute pivoted to the said support, a dog adapted for engagement with the ratchet-wheel and operated through the movement of the chute, and a connection between said chute and said handle-lever, whereby the position of the chute may be changed relative to the ground by manipulating the pivotal section of the handle, as described.

7. In a replanting attachment, a handle consisting of a fixed and a pivoted section, a support for the fixed section, a locking device connecting the two sections of the handle, and a release for the locking device, a seed-drop mechanism, a pivoted seed-drop chute, and a feed device for the seed-drop mechanism, all of which are operated by the movement of the pivoted section of the handle, as described.

In testimony whereof I have signed my name to this specification in the presence of two subscribing witnesses.

JURGEN W. GRONEWOLD.

Witnesses:
M. HICKEN,
J. J. EMMINGA.